(12) United States Patent
Rahemtulla

(10) Patent No.: US 6,487,068 B1
(45) Date of Patent: Nov. 26, 2002

(54) COMPUTER DISPLAYS

(75) Inventor: Karim Rahemtulla, Houghton Regis (GB)

(73) Assignee: Checkout Holdings Limited (GB)

( * ) Notice: Subject to any disclaimer, the term of this patent is extended or adjusted under 35 U.S.C. 154(b) by 0 days.

(21) Appl. No.: 09/530,885

(22) PCT Filed: Sep. 1, 1999

(86) PCT No.: PCT/GB99/02885

§ 371 (c)(1),
(2), (4) Date: Sep. 25, 2000

(87) PCT Pub. No.: WO00/29930

PCT Pub. Date: May 25, 2000

(30) Foreign Application Priority Data

Nov. 16, 1998 (GB) .............................................. 9825108

(51) Int. Cl.$^7$ .................................................. G06F 1/16
(52) U.S. Cl. ........................ 361/681; 361/683; 361/680; 312/223.1; 364/708.1
(58) Field of Search ................................ 361/681, 682, 361/683, 686, 725, 731; 364/708.1; 349/58; 345/905, 168, 169; 235/381, 383, 385, 492, 493, 494, 449, 462.143, 966.45, 451, 440; 298/917–923; 705/4, 16, 161

(56) References Cited

U.S. PATENT DOCUMENTS

| | | | |
|---|---|---|---|
| 5,224,060 A | | 6/1993 | Ma |
| 5,255,214 A | | 10/1993 | Ma |
| 5,276,589 A | | 1/1994 | Bartlett et al. |
| 5,374,940 A | | 12/1994 | Corio |
| 5,414,831 A | | 5/1995 | Wilson et al. |
| 5,619,397 A | * | 4/1997 | Honda et al. ............... 361/686 |
| 5,644,469 A | | 7/1997 | Shioya et al. |
| 5,668,570 A | | 9/1997 | Ditzik |
| 5,692,211 A | | 11/1997 | Gulick et al. |
| 5,740,387 A | | 4/1998 | Lambrecht et al. |
| 5,771,152 A | * | 6/1998 | Crompton et al. .......... 361/681 |
| 5,796,577 A | * | 8/1998 | Ouchi et al. ................. 361/681 |
| 6,003,008 A | * | 12/1999 | Postrel et al. ................... 705/4 |
| 6,053,412 A | * | 4/2000 | Wike et al. ............. 235/462.43 |
| 6,094,341 A | * | 7/2000 | Lin ............................. 361/681 |
| 6,193,152 B1 | * | 2/2001 | Fernando et al. ........... 235/380 |

FOREIGN PATENT DOCUMENTS

| | | | | |
|---|---|---|---|---|
| JP | 405216830 A | * | 8/1993 | ........... G06F/15/02 |
| WO | WO 90/12356 | | 10/1990 | |
| WO | WO 91/07716 | | 5/1991 | |
| WO | WO 96/03685 | | 2/1996 | |

OTHER PUBLICATIONS

Jarltech International Inc; The New Age of Interactive Transaction; 8 pages; 1998 Taiwan.

Fujitsu; TeamPOS for fast, functional and efficient point–of–sale operations; 4 pages; 1998; Japan.

Toshiba; Interactive Touch Screen POS Terminals; TEC Open Pos Terminal ST–60 Series; 4 pages; Tokyo.

ASCII vol. 22 No. 8, ASCII Corporation, Aug. 1, 1998, pp. 230–233.

DOS/V magazine, 1998, vol. 7, No. 19, Oct. 1, Softbank Corp., published on Oct. 1, 1998, p. 172 p. 176.

* cited by examiner

Primary Examiner—Darren Schuberg
Assistant Examiner—Michael Datskovsky
(74) Attorney, Agent, or Firm—Clayton, Howarth & Cannon, P.C.

(57) ABSTRACT

A PC (10) comprises a PC housing (14) containing conventional PC architecture including a motherboard having a processor and associated peripheral circuitry, a hard disc and external disc inputs (16, 18). A display assembly (12) comprising a housing and a flat screen display is pivotally mounted to the front edge of the PC housing (14) and the flat screen display is mounted on the outer face of the flat screen housing.

17 Claims, 4 Drawing Sheets

COMPUTER DISPLAYS

BACKGROUND

1. The Field of the Invention

This invention relates to computer displays, and in particular to foldable displays such as are used, for example, in laptop PCS.

2. The Background Art

A laptop PC is intended to be used by a single person operating a keyboard or other input device which is integral within the laptop and using a hinged display. The display is located on the inside of the display and is usually an LCD type display. As laptops are intended to be carried around, the location of the display protects it from accidental damage.

The display arrangement is less convenient when the display is to be viewed by a number of people or the laptop is intended for uses other than by a particular user, for example, it would be very difficult to wall mount a laptop, say in an information centre as the display would be hard to see. Even if the display hinge could be rotated through 180°, the footprint of the laptop would be twice the footprint when it is closed.

BRIEF SUMMARY OF THE INVENTION

The invention aims to overcome the disadvantages of laptop displays and to provide displays which are more suitable for retail and hospitality environments as well as a variety of other environments in which the computer is intended to be used by a variety of different people.

The invention in its broadest form resides in a display which is mounted to a main body in which the display screen is on the outer face of the display such that when the display is folded to a flat position the display is still visible.

More particularly there is provided a PC computer comprising a PC housing having mounted therein a processor and associated peripherals; and a display housing having a display immovable with respect thereto, the display housing being pivotally mounted substantially at its lower edge to a fixed point on the PC housing substantially along one axis of the PC housing and movable between a first position generally parallel to the PC housing and a second position angled with respect to the PC housing, the display housing having an inner face opposite the PC housing in the first position and an outer face, the display being mounted on the outer face.

The invention has the advantage that the computer may be used in environments where it is desirable for a number of people to see a display. For example, in a flat configuration, the PC may be wall mounted. It is preferred that the display is a TFT touch screen display which is particularly advantageous in a wall mounted environment.

Preferably, the main body PC housing has an angled rear face with a second display housing mounted thereon. The display is also mounted on the outer face of the second display housing and is preferably a TFT touch screen display.

BRIEF DESCRIPTION OF THE DRAWINGS

Embodiments of the invention will now be described, by way of example only, and with reference to the accompanying drawings in which.

DETAILED DESCRIPTION OF THE PREFERRED EMBODIMENTS

Figure 1:
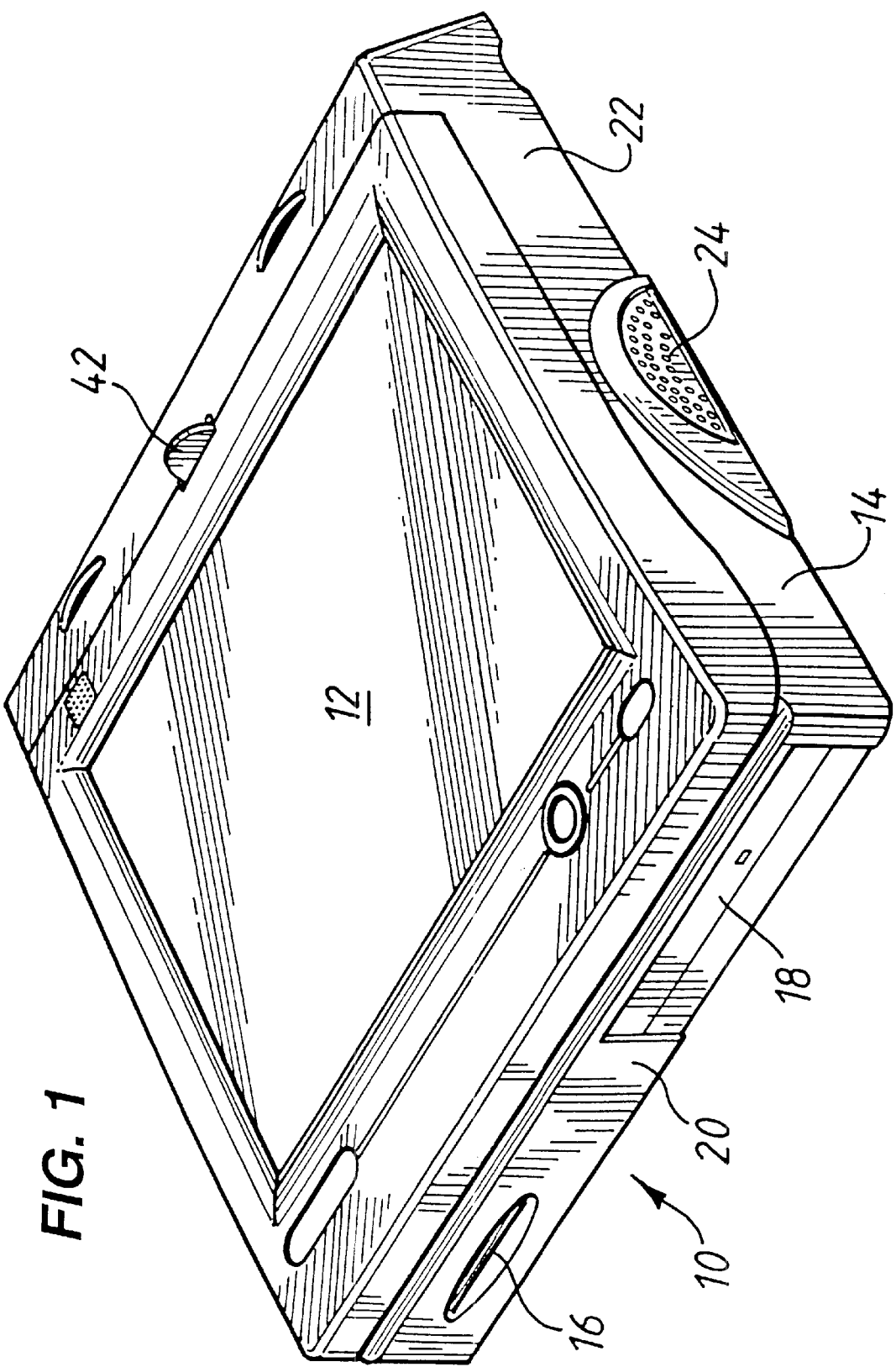
FIG. 1 is a front perspective view of a computer embodying the invention.

The computer illustrated in the figures is a PC computer 10 comprising a display assembly 12 and a base unit 14. The base unit or PC housing 14, houses all the standard PC architecture such as the motherboard containing the processor, chipsets, ROM and RAM memory and device controllers; a hard drive all diagrammatically respect in FIG. 1 at 46 and, as can be seen from FIG. 1, a floppy disc drive 16 and a CD-ROM or DVD drive 18 are mounted on the front face 20 of the housing. One of the side walls' 22 includes three arcuate series of apertures 24 which provide an outlet for sound from a speaker mounted behind the apertures in the housing. A similar set of apertures is provided on the other side wall 26 (FIG. 2).

Figure 2:
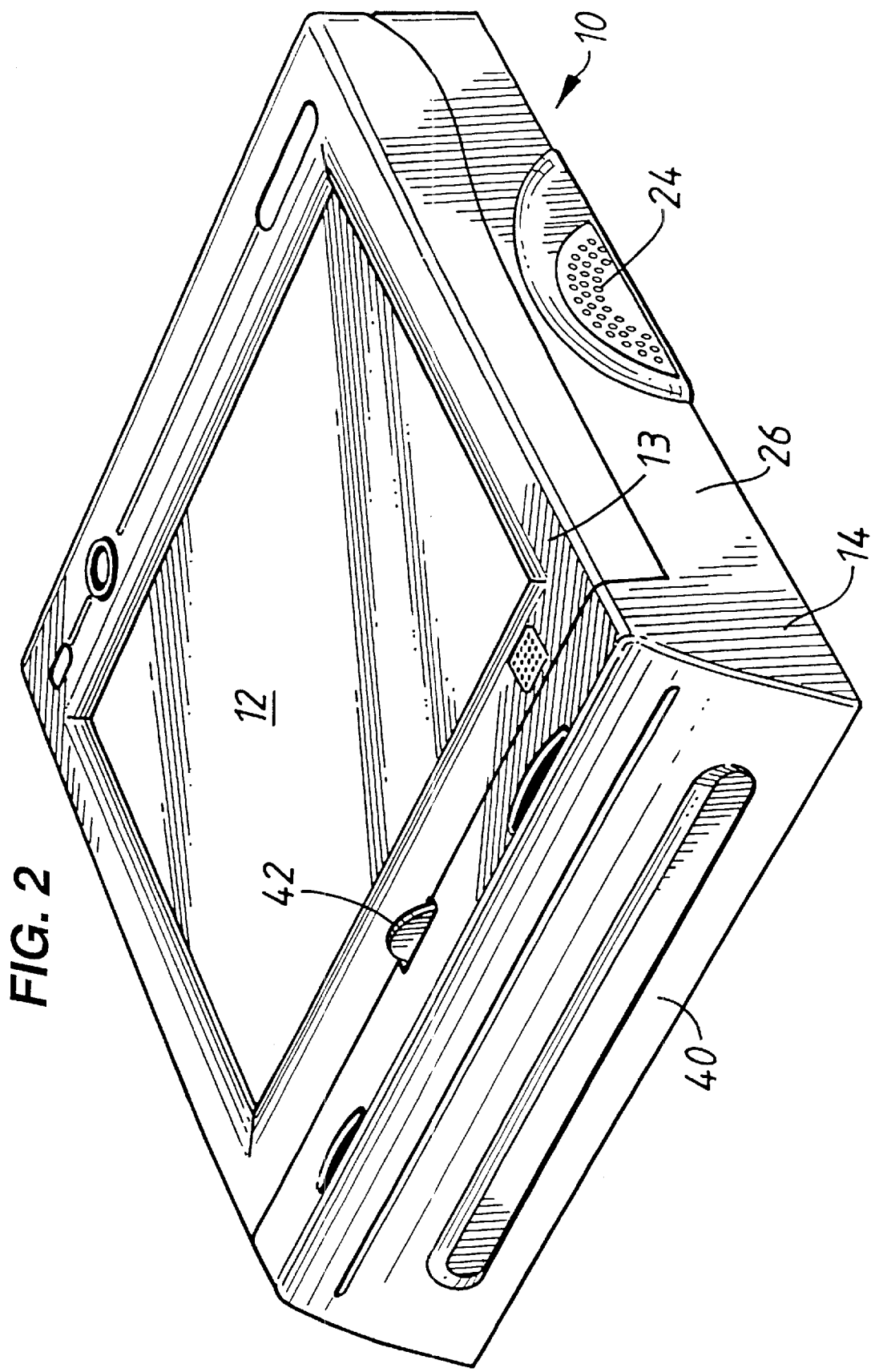
FIG. 2 is a rear perspective view of the computer of FIG. 1.
Figure 3:
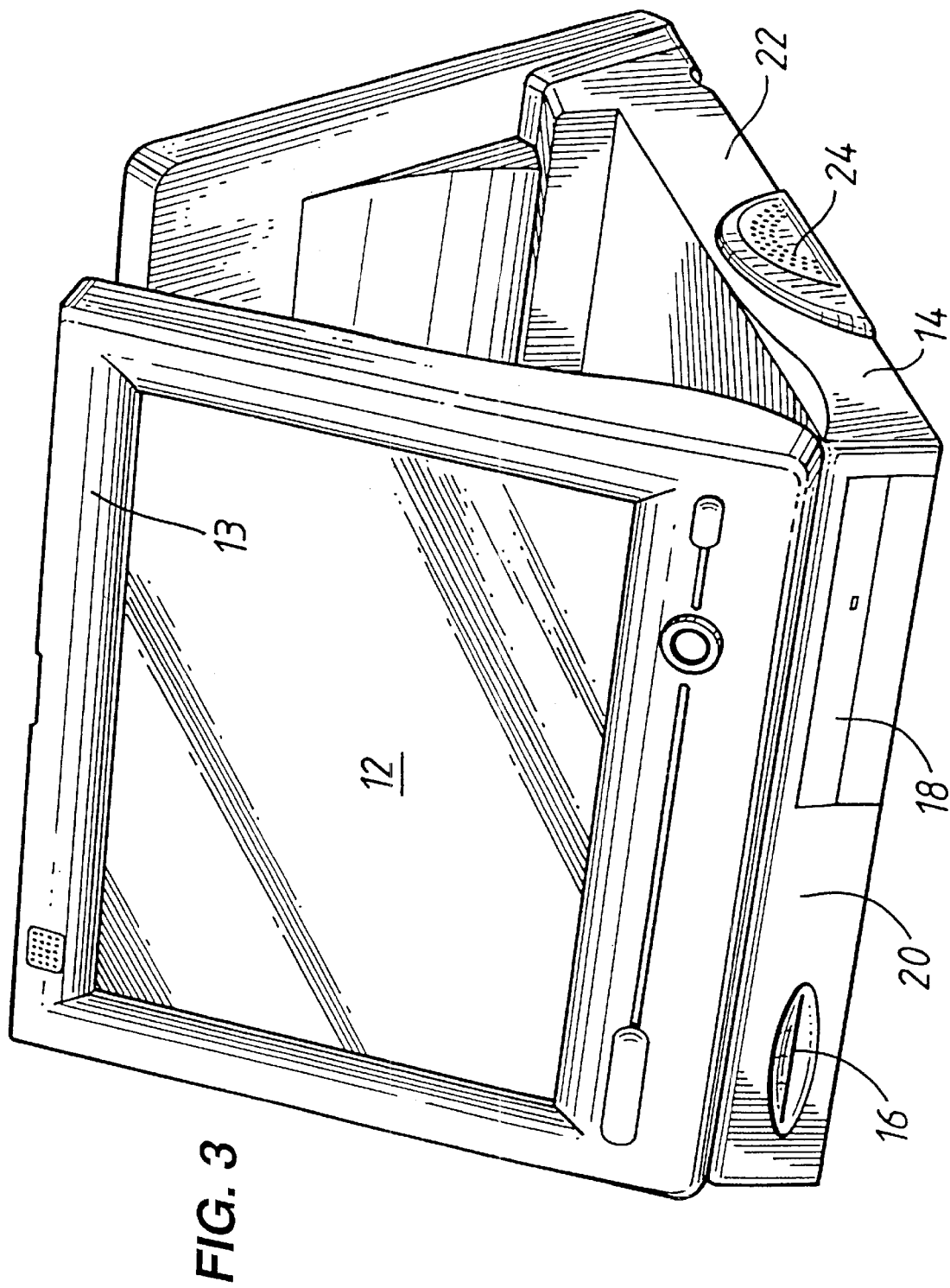
FIG. 3 is a perspective view of a second embodiment of the invention showing the screen in a raised position.
Figure 4:
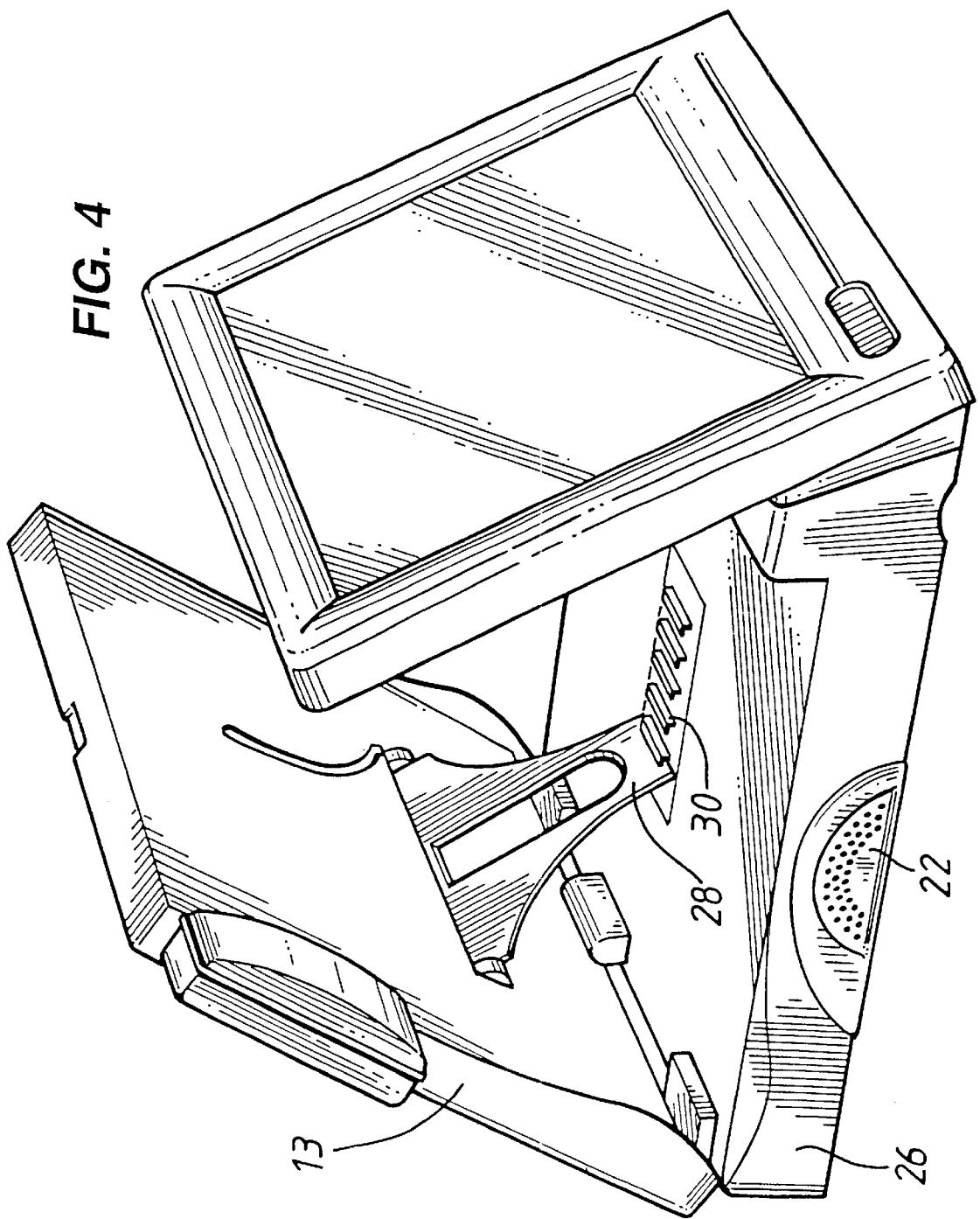
FIG. 4 is a further perspective view of the embodiment of FIG. 3.

The display assembly is hinged to the main housing and comprises a flat screen display 12, which is arranged on the outside such that when the display is moved to a "closed" position as shown in FIGS. 1 and 2, the display is visible. Thus, rather than having open and closed positions as in a conventional laptop, the display is visible at all times and can be moved from a flat position in which it is generally parallel to the housing to a number of positions in which it is angled to the housing. The display 12 is mounted in a display housing and is fixed with respect to the display housing. Thus, the display cannot move except with the display housing. The display assembly is pivoted using a pair of torque hinges as is well known from laptops and does not require further description. The torque hinges are mounted on the display housing substantially at its lower edge to enable pivotal movement of the display housing 13 FIG. 2 with respect to the PC housing 14. The torque hinges are fixed to the PC housing 14 such that the display housing pivots about a fixed axis on the PC housing. That axis is substantially along one edge of the PC housing. In the example shown it is the rear edge. The torque hinge allows maximum friction. In addition, as can be seen in FIGS. 3 and 4 which illustrate a second embodiment of the invention and show the screen in a raised position, the display assembly 12, 13 is held in place with a prop and rack mechanism 28, 30. The prop 28 comprises a generally T-shaped arm which is hinged at the rear of the display and tapers towards its free end. At the free end is an elongate aperture 32 which receives a portion of the rack. The rack 30 comprises a series, of five in FIG. 2, of retaining elements which each comprises a generally upright elongate portion and a generally flat elongate portion parallel to and spaced from the housing and which together form a catch. The flat elongate portion is received in the aperture at the free end of the prop to hold the prop in place. The rack is moulded integral with the upper surface of the housing.

The display may be any conventional flat screen display, although it is preferred to use a SVGA TFT, XGA TFT, UXGA TFT or Super TFT™ (thin film transistor) each of which can provide touch screen capabilities. In many anticipated applications this eliminates the need for input devices such as a keyboard or mouse. However, it will be appreciated that a keyboard or mouse could be used, either as a separate plug in component or as an integral component, for example built in to the upper surface of the housing. As can be seen from FIG. 4, a card reader 44 is formed on the side of the display (not represented in FIG. 3).

As can be seen from FIGS. 1 and 2, the display assembly latches into the flat position such that it is fixed in position. To move the display assembly, pressure is applied to the latch 42 to release the latch. The assembly can then be pivoted.

In the flat position shown in FIGS. 1 and 2, the single display unit may be wall mounted or mounted flush with a counter. In the tilted orientation the computer may be mounted on a flat or sloped surface and the angle of tilt adjusted as required.

In the embodiment of FIGS. 1 and 2 the computer is shown as having a single hinged display assembly. The embodiment of FIGS. 3 and 4 shows an alternative embodiment in which a second display assembly is provided which is fixed at an angle to the housing. The second display assembly is mounted on a sloped rear wall 40 (shown best in FIG. 2) of the housing and may be detached.

The embodiments described have a number of advantages. First, the viewer may select the angle at which the display is viewed. By mounting the screen on the outside surface, the display is easily viewed by third parties. The PC may be mounted on a counter top, in which case the embodiment of FIGS. 3 & 4 is especially useful for touch-screen EPOS (electronic point of sale). In either configuration the display may be used as an interactive customer display system. Embodiments of the invention may be used in environments such as hotel rooms in which case terminals may be pole or wall mounted to give combined TV/PC/Internet touchscreen facilities. Alternatively, the display may be used as a customer service screen.

What is claimed is:

1. A personal computer comprising:
   a PC housing having an upper surface and a lower surface, the upper surface substantially parallel to said lower surface, a processor and associated peripherals mounted therein;
   a display;
   a display housing, said display being immovably mounted within said display housing; and a pivot connecting the display housing to the PC housing substantially at a front edge thereof, the pivot allowing pivotal movement of the display housing about substantially its lower edge with respect to the PC housing; wherein
   said display housing is movable between a first position generally parallel to said lower surface of PC housing, and a second position angled with respect to said PC housing; and wherein said display housing has an inner surface facing said PC housing upper surface when said display housing is in said first position, and an outer surface with the display mounted therein;
   wherein the PC housing has an angled rear wall; and
   wherein the personal computer further comprises a second display housing mounted on the angled rear wall of the PC housing, the second display housing having an inner face and an outer face.

2. A personal computer according to claim 1, wherein the PC housing has an upper surface having a rack thereon and the inner face of the display housing has a prop, the prop being received in the rack in one of a plurality of positions to maintain the display housing at one of a plurality of attitudes to the PC housing.

3. A personal computer according to claim 1, wherein the display housing is connected to the PC housing by a torque hinge.

4. A personal computer according to claim 3, wherein the display housing is connected to the PC housing by a pair of torque hinges.

5. A personal computer according to claim 1, wherein the second display housing has a second display mounted on its outer face.

6. A personal computer according to claim 1, wherein the display is a TFT display.

7. A personal computer according to claim 1, wherein the display is a touch screen display.

8. A personal computer according to claim 1, comprising a card reader mounted on the display housing.

9. A personal computer comprising:
   a PC housing having an upper surface and a lower surface, the upper surface substantially parallel to said lower surface, a processor and associated peripherals mounted therein;
   a display;
   a display housing; said display being immovably mounted within said display housing; and a pivot connecting the display housing to the PC housing substantially at a front edge thereof, the pivot allowing pivotal movement of the display housing about substantially its lower edge with respect to the PC housing; wherein
   said display housing is movable between a first position generally parallel to said lower surface of PC housing, and a second position angled with respect to said PC housing; and wherein said display housing has an inner surface facing said PC housing upper surface when said display housing is in said first position, and an outer surface with the display mounted therein; and
   a second display housing at the rear of said PC housing.

10. A personal computer according to claim 9 wherein the display is a touch screen display.

11. A personal computer comprising:
    a PC housing having a rear, a base, and an axis;
    a processor;
    peripherals associated with said processor; said processor and said peripherals being mounted within said PC housing;
    a first display housing having a lower edge, an inner surface and an outer surface;
    a first display immovably mounted within said first display housing on said outer surface thereof, the display housing being pivotally mounted along said lower edge to said PC housing substantially along said axis;
    and a second display housing have a second display thereon at said rear of said PC housing; wherein
    said first display housing and said first display are pivotable between a first position generally parallel to said base of said PC housing and a second position angled with respect to said PC housing, said inner face of said first display housing being opposite said PC housing in said first position.

12. A touch screen EPOS (Electronic Point of Sale) terminal comprising:
    a PC housing having an upper surface, a lower surface and a rear;
    a processor and associated peripherals mounted within said PC housing;
    a first display housing having an outer surface and an inner surface;
    a touch screen display immovably mounted within said first display housing;

a pivot for pivoting said first display housing with respect to said PC housing, said first display housing being pivoted at a lower edge thereof about an axis of said PC housing located towards a front edge thereof;

a second display housing;

said second display housing extends above said upper surface of said PC housing and includes a top surface;

a second display housed in said second display housing;

wherein said first display housing and said touch screen display are pivotable between a first position generally parallel to the lower surface of the PC housing with said outer surface of said first display housing substantially flush with said top surface of said second display housing, and a second position angled with respect to said PC housing, the inner surface of said first display housing facing said upper surface of said PC housing in said first position and said touch screen display being visible at all positions of said first display housing.

13. A touch screen EPOS terminal according to claim 12, comprising a card reader mounted at a side wall of said first display housing.

14. A PC comprising:

a PC housing having a rear wall;

a display housing;

a plurality of displays;

a PC processor and associated peripherals mounted in the PC housing;

wherein said display housing is mounted substantially along its lower edge to said PC housing substantially along a front edge thereof, said display housing being movable about an axis between a first position substantially parallel to the PC housing and a second position angled with respect to the PC housing; wherein said display housing further comprises an inner surface facing said PC housing when said display housing is in said first position, and an outer surface with a first display of said plurality of displays mounted thereon and immovable with respect thereto;

and wherein a second display of said plurality of displays is mounted on the rear wall of the PC housing; whereby the second display faces away from said first display when said first display is in said second position.

15. A personal computer according to claim 14, further comprising a card reader mounted to a side wall of first display housing.

16. An EPOS terminal comprising:

a PC housing having a lower surface and a rear;

a processor and associated peripherals mounted with said PC housing;

a first display housing having an outer surface and an inner surface;

a first display immovably mounted within said first display housing;

a pivot for pivoting said first display housing with respect to said PC housing, said first display housing being pivoted at a lower edge thereof about an axis of said PC housing;

a second display housing; said second display housing being mounted at the rear of said PC housing and being arranged at least partially above said PC housing;

a second display housed in said second display housing;

wherein said first display housing and said first display are pivotable between a first position generally parallel to the lower surface of said PC housing, and a second position angled with respect to said PC housing, the inner surface of said first display housing facing the PC housing in said PC housing, said first display being visible at all positions of said first display housing.

17. A EPOS terminal according to claim 16, further comprising a card reader mounted to a side wall of the first display housing.

* * * * *